Patented July 10, 1923.

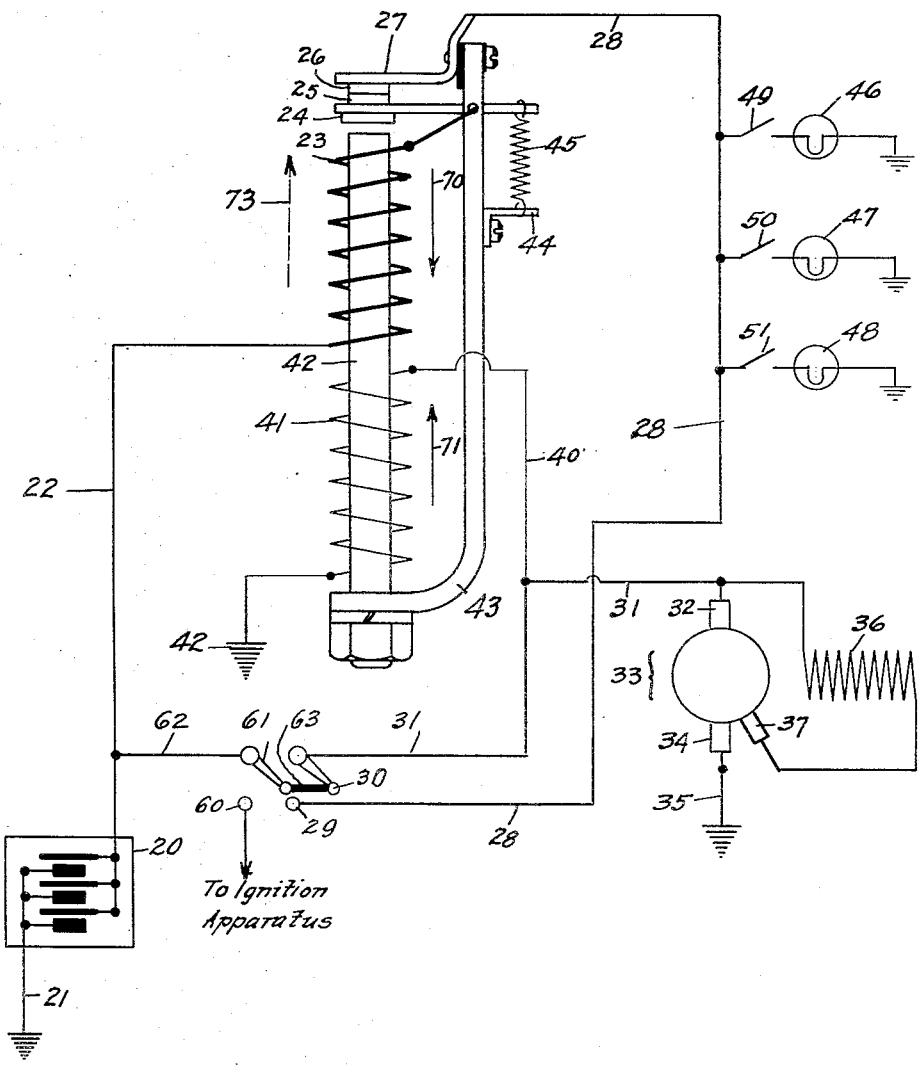

1,461,215

UNITED STATES PATENT OFFICE.

JOHN H. HUNT, OF DAYTON, OHIO, ASSIGNOR TO THE DAYTON ENGINEERING LABORATORIES COMPANY, A CORPORATION OF OHIO.

SIGNAL.

Application filed September 30, 1918. Serial No. 256,162.

*To all whom it may concern:*

Be it known that I, JOHN H. HUNT, a citizen of the United States of America, residing at Dayton, county of Montgomery, State of Ohio, have invented certain new and useful Improvements in Signals, of which the following is a full, clear, and exact description.

This invention relates to electrical signalling devices, and particularly to devices for use in connection with the battery charging systems of automobiles.

It is an object of the invention to provide an electrical signalling device which will produce an audible signal if the generator of the battery charging system is left connected with the battery after the engine has stopped, and which will also indicate a short circuit of the lights or other electric translation devices which are associated with the system.

Other and further objects and advantages of the present invention will be apparent from the following description, reference being had to the accompanying drawing, wherein a preferred embodiment of the present invention is clearly shown.

The drawing shows a wiring diagram including the present invention.

Referring to the drawing, the battery charging circuit includes the battery 20 grounded at 21 and connected by means of wire 22 with a winding 23 of comparatively heavy wire of a polarized signaling device. The winding 23 is connected with a movable armature 24 of the polarized signaling device, which is provided with a contact 25. Contact 25 cooperates with the stationary contact 26 mounted on a bracket 27. Bracket 27 is connected by wire 28 with a switch contact 29. The movable switch contact 30 connects contact 29 with wire 31, which is connected with a main brush 32 of a generator 33. The other main brush 34 is grounded at 35.

The shunt field winding 36 is connected with the wire 31 and with a third brush 37. In this manner the battery charging circuit is complete.

Wire 40 leads out from the wire 31 and is connected with an auxiliary winding 41 of the polarized signaling device of comparatively fine wire. This winding 41 is grounded at 42. The windings 23 and 41 are mounted on a core 42 which is supported on a frame 43 of the polarized signaling device. The frame 43 supports for movement the armature 24, and the bracket 27, the latter being insulated from the frame 43. The frame 43 also supports a spring bracket 44 to which is connected a spring 45, which in turn is connected with one end of the armature 24.

Electric lights or other translation devices 46, 47 and 48 are connected with wire 28 by means of switches 49, 50 and 51 and have ground connections with the battery 20.

The ignition apparatus for the automobile engine may also receive its current from the system described, but since the ignition system per se does not form a part of the present invention, it has not been shown. It will be understood, however, that the ignition apparatus may have a ground connection with a battery and is connected to a stationary switch contact 60. A movable switch contact 61 cooperates with the contact 60 to make a connection with the wire 62 which is connected to the wire 22.

The switch elements 61 and 30 are preferably interconnected by member 63 so that these switch elements may be moved at the same time, or in order that when the generator is disconnected from the battery, the ignition system will also be disconnected. The advantages of this feature will be apparent from the operation of the device which follows:

When the generator 33 is delivering current to the battery 20, the flow of current through the series winding 23 of the polarized signaling device is such that the magnetomotive-force due to this current will be in the direction of the arrow 70, while the direction of the magnetomotive-force due to the flow of the current through the auxiliary winding 41 will be in the direction of the arrow 71. It is apparent that these magnetomotive-forces oppose each other, and the result is such that the armature 24 will not be attracted.

If the engine should stop with the generator left connected to the battery the current would be discharged from the battery through the generator. When this occurs the flow of current through the coil 23 is such that the magnetomotive-force resulting is in the direction of the arrow 73, while the magnetomotive-force resulting from the flow of current thorugh the winding 41 is still in the direction of the arrow 71. The result is that the armature 24 will be attracted and will interrupt the discharge of current from the battery. However, when this occurs the spring 45 will cause the armature 24 to return to contact closing position and the armature will be again attracted. As long as current is discharged from the battery through the generator the contacts 24 and 25 will be intermittently separated and closed, thereby producing a clicking sound which will indicate to the operator that the switch member 30 must be moved to open position in order to prevent further discharging of the battery through the generator.

If, while the generator is running, the circuits to the lights 46, 47, and 48 should be grounded or over-loaded, there would be an abnormally large flow of current from the battery. When this happens, sufficient current from the battery will flow through series winding 23 to reverse completely the current through the winding and to produce an effect which is the same as where the battery discharges through the generator after the engine is stopped. A clicking sound will be produced as before, which will indicate to the operator that there is a short circuit or trouble somewhere. The operator will then operate the lighting switches 49, 50 and 51 in order to assist in locating the trouble or prevent further abnormal discharge.

By providing an interconnection between the switch member 30, this discharge of the battery through the ignition system after the engine has stopped is also prevented. If the engine should stop with the switches 61 and 30 closed, the signal will operate to indicate to the operator to move the member 63 in a manner to disconnect the generator and the ignition system from the battery. Thus it will be seen that the same signaling device will indicate to the operator that both the ignition system and the generator have been left connected after the engine has been stopped.

While the form of mechanism herein shown and described constitutes a preferred form of embodiment of the invention, it is to be understood that other forms might be adopted, all coming within the scope of the claim which follows:

In an electrical system a generator, a storage battery and electrical signaling means for indicating when the battery is discharging through said generator, said signaling means including an electromagnet comprising a core and an electromagnetic winding, an armature for said magnet, a switch comprising a contact carried by said armature and a stationary contact and means for yieldingly holding said contacts together; a circuit connecting said battery to said generator and including said electromagnetic winding and said switch in series, whereby the circuit will be intermittently opened when said magnet is energized and an indication will be given by the striking of the contacts against each other; and a polarizing winding on said magnet core connected across the terminals of said generator to prevent said magnet from attracting its armature when current is flowing from said generator to said battery and to permit it to attract its armature when current is flowing from said battery to said generator.

In testimony whereof I affix my signature.

JOHN H. HUNT.

Witnesses:
J. W. McDonald,
M. A. Peare.